US012785785B2

(12) United States Patent
Yuan et al.

(10) Patent No.: US 12,785,785 B2
(45) Date of Patent: Nov. 3, 2026

(54) TRANSMISSION CONFIGURATION INDICATOR STATE SELECTION WITHOUT INDICATION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 18/575,106

(22) PCT Filed: Aug. 24, 2021

(86) PCT No.: PCT/CN2021/114227
§ 371 (c)(1),
(2) Date: Dec. 28, 2023

(87) PCT Pub. No.: WO2023/023928
PCT Pub. Date: Mar. 2, 2023

(65) Prior Publication Data
US 2024/0333369 A1 Oct. 3, 2024

(51) Int. Cl.
*H04B 7/06* (2006.01)
*H04B 7/08* (2006.01)
*H04W 72/232* (2023.01)

(52) U.S. Cl.
CPC ......... *H04B 7/06968* (2023.05); *H04B 7/088* (2013.01); *H04W 72/232* (2023.01)

(58) Field of Classification Search
CPC .... H04B 7/06968; H04B 7/088; H04B 7/008; H04W 72/232; H04W 72/0493;
(Continued)

(56) References Cited

U.S. PATENT DOCUMENTS

2020/0229161 A1 7/2020 Raghavan et al.
2021/0067979 A1* 3/2021 Rahman ................ H04L 5/0053
(Continued)

FOREIGN PATENT DOCUMENTS

CN 110809321 A 2/2020
WO 2021064959 A1 4/2021
(Continued)

OTHER PUBLICATIONS

Supplementary European Search Report—EP21954474—Search Authority—Munich—Mar. 20, 2025.
(Continued)

*Primary Examiner* — Rushil P. Sampat
(74) *Attorney, Agent, or Firm* — Harrity & Harrity LLP

(57) ABSTRACT

Various aspects of the present disclosure generally relate to wireless communication. In some aspects, a user equipment (UE) may select, as a transmission configuration indicator (TCI) state for a channel or reference signal (RS) in a bandwidth part (BWP), a TCI state associated with: a TCI list received in a radio resource control (RRC) message for the BWP; a codepoint identifier (ID) activated by a medium access control control element (MAC CE) for the BWP; or a scheduling downlink control information (DCI) for the channel or RS, based at least in part on determining that the UE has not received an indication of the TCI state for the channel or RS, or quasi co-location (QCL) information that indicates the TCI state for the channel or RS. The UE may transmit or receive a communication using the selected TCI state. Numerous other aspects are provided.

30 Claims, 8 Drawing Sheets

(58) Field of Classification Search
CPC ............... H04W 72/53; H04W 72/042; H04W 72/0453; H04W 72/046; H04W 72/23; H04W 80/02; H04L 5/00; H04L 5/0023; H04L 5/0037; H04L 5/0053; H04L 5/0058; H04L 5/0094; H04L 5/0048; H04L 5/005
See application file for complete search history.

(56) References Cited

U.S. PATENT DOCUMENTS

| | | | | |
|---|---|---|---|---|
| 2021/0153209 | A1* | 5/2021 | Guan | H04L 5/0094 |
| 2022/0400505 | A1 | 12/2022 | Matsumura et al. | |
| 2022/0408371 | A1 | 12/2022 | Matsumura et al. | |
| 2023/0027281 | A1* | 1/2023 | Sun | H04L 5/001 |
| 2023/0292335 | A1* | 9/2023 | Park | H04W 72/231 |
| 2023/0300835 | A1* | 9/2023 | Muruganathan | H04B 7/06968 370/329 |
| 2023/0319839 | A1* | 10/2023 | Nilsson | H04L 5/0091 370/329 |
| 2024/0015740 | A1* | 1/2024 | Xiao | H04W 72/1273 |

FOREIGN PATENT DOCUMENTS

| | | | |
|---|---|---|---|
| WO | 2021090507 | A1 | 5/2021 |
| WO | WO-2021088583 | A1 | 5/2021 |
| WO | WO-2021095025 | A1 | 5/2021 |

OTHER PUBLICATIONS

International Search Report and Written Opinion—PCT/CN2021/114227—ISA/EPO—Apr. 25, 2022.

Qualcomm Incorporated: "Enhanced TCI States Activation/Deactivation PDSCH MAC CE for Multi-TRP", 3GPP Draft, 3GPP TSG-RAN WG2 Meeting #107bis, R2-1913407_Enhanced TCI States Activation_Deactivation PDSCH MAC CE For Multi-TRP, 3rd Generation Partnership Project (3GPP), Mobile Competence Centre, 650, Route Des Lucioles, F-06921, S, vol. RAN WG2, no. Chongqing, China, Oct. 14, 2019-Oct. 18, 2019, Oct. 4, 2019 (Oct. 4, 2019), XP051804984, pp. 1-3, The Whole Document.

VIVO: "Further Discussion on Multi Beam Enhancement", 3GPP TSGRAN WG1 #106-e, R1-2106571, e-Meeting, Aug. 16-27, 2021, XP052037877, 30 Pages, Sections 2, 3, 6.

Nokia, et al., "Multi-cell Support for Multi-TRP", 3GPP TSG-RAN WG2 Meeting #115 Electronic, R2-2107948, Elbonia, Aug. 1, 2021-Aug. 11, 2021, Aug. 6, 2021, 14 Pages.

3GPP: "3rd Generation Partnership Project; Technical Specification Group Radio Access Network; NR; Physical Layer Procedures for Control (Release 16)", 3GPP TS 38.213 V16.2.0, Technical Specification, Jul. 20, 2020, pp. 1-176.

3GPP: "3rd Generation Partnership Project, Technical Specification Group Radio Access Network, NR, Physical Layer Procedures for Data (Release 16)", 3GPP TS 38.214 V16.2.0, Jul. 20, 2020, pp. 1-163.

* cited by examiner

TRANSMISSION CONFIGURATION INDICATOR STATE SELECTION WITHOUT INDICATION

CROSS-REFERENCE TO RELATED APPLICATION

This Patent Application is a 371 national stage of PCT Application No. PCT/CN2021/114227, filed on Aug. 24, 2021, entitled "TRANSMISSION CONFIGURATION INDICATOR STATE SELECTION WITHOUT INDICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for selecting a transmission configuration indicator (TCI) state without receiving an indication of the TCI state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE. NR, and other radio access technologies remain useful.

A beam, such as a base station transmit beam or a UE receive beam, may be associated with a transmission configuration indication (TCI) state. A TCI state may indicate a directionality, a configuration, or a characteristic of the beam for a channel or reference signal (RS), usually from the viewpoint of a base station. A spatial relation may indicate a directionality, a configuration, or a characteristic of a beam from the viewpoint of a UE. That is, while a TC state may be associated with a downlink beam for a base station, a spatial relation may be associated with an uplink beam for a UE.

Under a unified TCI state framework, a TC state may be used to indicate more than one beam, which may be a beam for a downlink channel or RS and/or a beam for an uplink channel or RS. There may be multiple types of unified TCI states. For example, a joint downlink/uplink common TCI state may indicate a common beam for at least one downlink channel or RS and at least one uplink channel or RS. A separate downlink common TCI state may indicate a common beam for more than one downlink channel or RS. A separate uplink common TCI state may indicate a common beam for more than one uplink channel or RS.

Each channel or RS is to have a beam indicated with a TCI state or a spatial relation associated with a TC state. A base station may indicate a beam (TCI state) to a UE. However, indicating a TCI state for every beam adds overhead that consumes signaling resources. Furthermore, if the UE does not receive a timely indication of the TC state for a channel or RS (or receive information that can be used to determine the TCI state), the UE may not use an optimal beam. This may degrade communications or add latency to the communications. Degraded communications consume additional processing resources and signaling resources.

SUMMARY

Some aspects described herein relate to a method of wireless communication performed by a user equipment (UE). The method may include selecting, as a transmission configuration indicator (TCI) state for a channel or reference signal (RS) in a bandwidth part (BWP), a TCI state associated with: a TCI list received in a radio resource control (RRC) message for the BWP, a codepoint identifier (ID) activated by a medium access control control element (MAC CE) for the BWP, or a scheduling downlink control information (DCI) for the channel or RS, based at least in part on determining that the UE has not received an indication of the TCI state for the channel or RS, or quasi co-location (QCL) information that indicates the TCI state for the channel or RS. The method may include transmitting or receiving, by the UE, a communication using the selected TCI state.

Some aspects described herein relate to a method of wireless communication performed by a base station. The method may include selecting, as a TCI state to be used by a UE for a channel or RS in a BWP, a TC state associated with: a TCI list transmitted to the UE in an RRC message for the BWP, a codepoint ID activated by a MAC CE transmitted to the UE for the BWP, or a scheduling DCI transmitted to the UE for the channel or RS, based at least in part on determining that the base station has not transmitted, to the UE, an indication of the TCI state for the channel or RS, or QCL information that indicates the TCI state for the channel or RS. The method may include transmitting or receiving, by the base station, a communication based at least in part on the selected TCI state.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the UE to select, as a TCI state for a channel or RS in a BWP, a TC state associated with: a TCI list received in an RRC message for the BWP, a codepoint ID activated by a MAC CE for the BWP, or a scheduling DCI for the channel or RS, based at least in part on determining that the UE has not received an indication of the TCI state for the channel or RS, or QCL information that indicates the TCI state for the channel or RS. The processor-readable code, when executed by the at least one processor, may be configured to cause the UE to transmit or receive a communication using the selected TCI state.

Some aspects described herein relate to abase station for wireless communication. The base station may include at least one processor and at least one memory, communicatively coupled with the at least one processor, that stores processor-readable code. The processor-readable code, when executed by the at least one processor, may be configured to cause the base station to select, as a TCI state to be used by a UE for a channel or RS in a BWP, a TCI state associated with: a TC list transmitted to the UE in an RRC message for the BWP, a codepoint ID activated by a MAC CE transmitted to the UE for the BWP, or a scheduling DCI transmitted to the UE for the channel or RS, based at least in part on determining that the base station has not transmitted, to the UE, an indication of the TCI state for the channel or RS, or QCL information that indicates the TCI state for the channel or RS. The processor-readable code, when executed by the at least one processor, may be configured to cause the base station to transmit or receive a communication based at least in part on the selected TCI state.

Some aspects described herein relate to anon-transitory computer-readable medium that stores a set of instructions for wireless communication by a UE. The set of instructions, when executed by one or more processors of the UE, may cause the UE to select, as a TCI state for a channel or RS in a BWP, a TCI state associated with: a TCI list received in an RRC message for the BWP, a codepoint ID activated by a MAC CE for the BWP, or a scheduling DCI for the channel or RS, based at least in part on determining that the UE has not received an indication of the TCI state for the channel or RS, or QCL information that indicates the TCI state for the channel or RS. The set of instructions, when executed by one or more processors of the UE, may cause the UE to transmit or receive a communication using the selected TC state.

Some aspects described herein relate to a non-transitory computer-readable medium that stores a set of instructions for wireless communication by a base station. The set of instructions, when executed by one or more processors of the base station, may cause the base station to select, as a TCI state to be used by a UE for a channel or RS in a BWP, a TC state associated with: a TCI list transmitted to the UE in an RRC message for the BWP, a codepoint ID activated by a MAC CE transmitted to the UE for the BWP, or a scheduling DC transmitted to the UE for the channel or RS, based at least in part on determining that the base station has not transmitted, to the UE, an indication of the TCI state for the channel or RS, or QCL information that indicates the TCI state for the channel or RS. The set of instructions, when executed by one or more processors of the base station, may cause the base station to transmit or receive a communication based at least in part on the selected TCI state.

Some aspects described herein relate to an apparatus for wireless communication. The apparatus may include means for selecting, as a TCI state for a channel or RS in a BWP, a TCI state associated with: a TCI list received in an RRC message for the BWP, a codepoint ID activated by a MAC CE for the BWP, or a scheduling DCI for the channel or RS, based at least in part on determining that the apparatus has not received an indication of the TCI state for the channel or RS, or QCL information that indicates the TCI state for the channel or RS. The apparatus may include means for transmitting or receiving a communication using the selected TCI state.

Some aspects described herein relate to an apparatus for wireless communication. The apparatus may include means for selecting, as a TCI state to be used by a UE for a channel or RS in a BWP, a TCI state associated with: a TCI list transmitted to the UE in an RRC message for the BWP, a codepoint ID activated by a MAC CE transmitted to the UE for the BWP, or a scheduling DCI transmitted to the UE for the channel or RS, based at least in part on determining that the apparatus has not transmitted, to the UE, an indication of the TCI state for the channel or RS, or QCL information that indicates the TCI state for the channel or RS. The apparatus may include means for transmitting or receiving a communication based at least in part on the selected TCI state.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
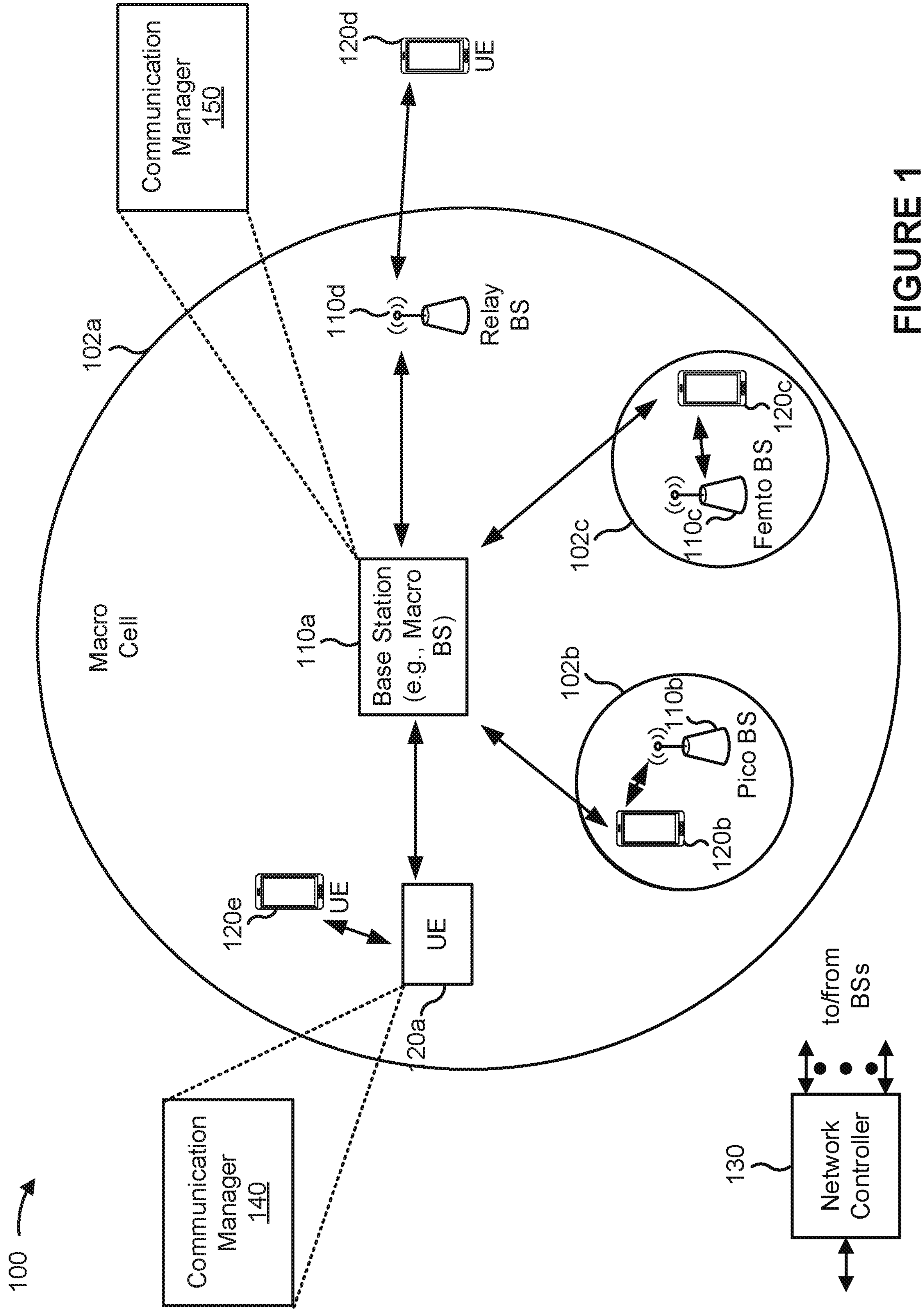
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to selecting a transmission configuration indicator (TCI) state in instances in which an indication of a TCI state (or quasi co-location (QCL) information for determining the TCI state) is not received or is absent for a channel or RS. Some aspects more specifically relate to selecting a particular TC state for a channel or reference signal (RS) in a bandwidth part (BWP) of a common carrier (CC). A wireless communication device, such as a UE, may select a TCI state for the channel or RS. In some aspects, the TCI state that the UE selects may be a TCI state associated with a TC list received in a radio resource control (RRC) message for the BWP. For example, the wireless communication device may select a first TC state in the TCI list or the TCI state with the lowest TCI state identifier (ID). In some aspects, the TCI state may be a TCI state associated with a codepoint ID activated by a medium access control control element (MAC CE) for the BWP. Selecting the TCI state associated with the codepoint ID may include selecting the TC state for a first codepoint with a TCI state ID activated by the MAC CE or the TCI state with the lowest codepoint ID activated by the MAC CE. In some aspects, the TCI state may be a TCI state associated with a scheduling downlink control information (DCI) for the channel or RS.

Particular aspects of the subject matter described in this disclosure can be implemented to realize one or more of the following potential advantages. In some examples, the described techniques can be used to reduce signaling overhead that would otherwise be necessary for a base station (or a UE) to transmit an indication of a TC state for each beam of multiple beams. The reduction of signaling overhead enables the base station and the UE to conserve signaling resources and processing resources.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110*d* (for example, a relay base station) may communicate with the BS 110*a* (for example, a macro base station) and the UE 120*d* in order to facilitate communication between the BS 110*a* and the UE 120*d*. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some examples, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may select, as a TCI state for a channel or RS in a BWP, a TC state associated with: a TCI list received in an RRC message for the BWP, a codepoint ID activated by a MAC CE for the BWP; or a scheduling DCI for the channel or RS, based at least in part on determining that the UE has not received an indication of the TCI state for the channel or RS, or QCL information that indicates the TCI state for the channel or RS. The communication manager 140 may transmit or receive a communication using the selected TCI state. Additionally or alternatively, the communication manager 140 may perform one or more other operations described herein.

In some aspects, the base station 110 may include a communication manager 150. As described in more detail elsewhere herein, the communication manager 150 may select, as a TC state to be used by a UE for a channel or RS in a BWP, a TC state associated with: a TCI list transmitted to the UE in an RRC message for the BWP, a codepoint ID activated by a MAC CE transmitted to the UE for the BWP; or a scheduling DCI transmitted to the UE for the channel or RS, based at least in part on determining that the base station has not transmitted, to the UE, an indication of the TCI state for the channel or RS, or QCL information that indicates the TCI state for the channel or RS. The communication manager 150 may transmit or receive a communication based at least in part on the selected TCI state. Additionally or alternatively, the communication manager 150 may perform one or more other operations described herein.

Figure 2:
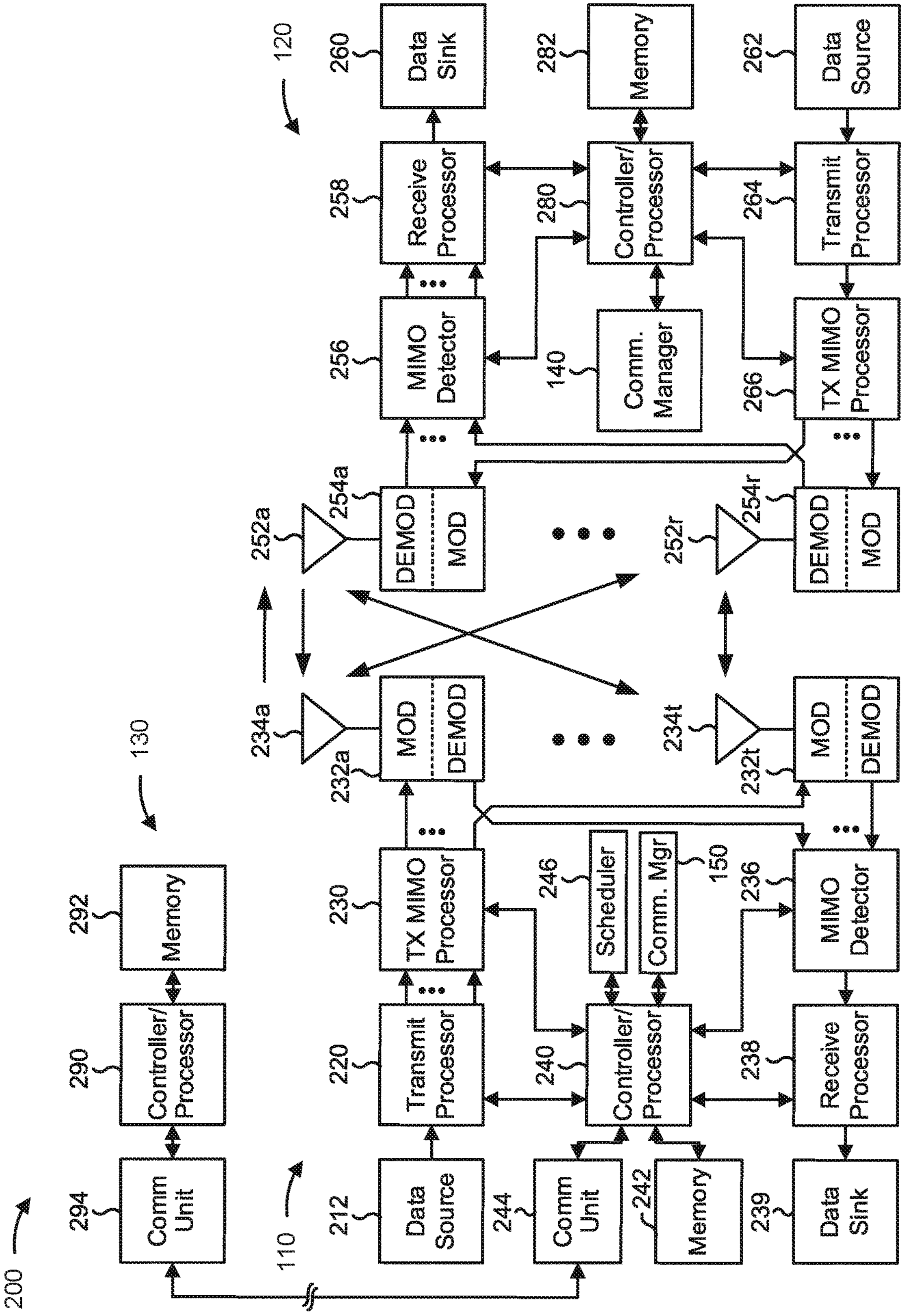
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the base station 110 or other base stations 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with selecting a TCI state if an indication of the TCI state is not received, as described in more detail elsewhere herein. For example, the controller/processor 240 of the base station 110, the controller/processor 280 of the UE 120, or any other component(s) of FIG. 2 may perform or direct operations of, for example, process 500 of FIG. 5, process 600 of FIG. 6, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 500 of FIG. 5, process 600 of FIG. 6, or other processes as described herein. In some examples, executing instructions may include running the instructions, converting the instructions, compiling the instructions, or interpreting the instructions, among other examples.

In some aspects, the UE 120 includes means for selecting, as a TCI state for a channel or RS in a BWP, a TCI state associated with: a TC list received in an RRC message for the BWP, a codepoint ID activated by a MAC CE for the BWP, or a scheduling DCI for the channel or RS, based at least in part on determining that the UE has not received an indication of the TCI state for the channel or RS, or QCL information that indicates the TCI state for the channel or RS; and/or means for transmitting or receiving a communication using the selected TC state. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for selecting, as a TC state to be used by a UE for a channel or RS in a BWP, a TCI state associated with: a TCI list transmitted to the UE in an RRC message for the BWP, a codepoint ID activated by a MAC CE transmitted to the UE for the BWP, or a scheduling DCI transmitted to the UE for the channel or RS, based at least in part on determining that the base station has not transmitted, to the UE, an indication of the TCI state for the channel or RS, or QCL information that indicates the TCI state for the channel or RS; and/or means for transmitting or receiving a communication based at least in part on the selected TCI state. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
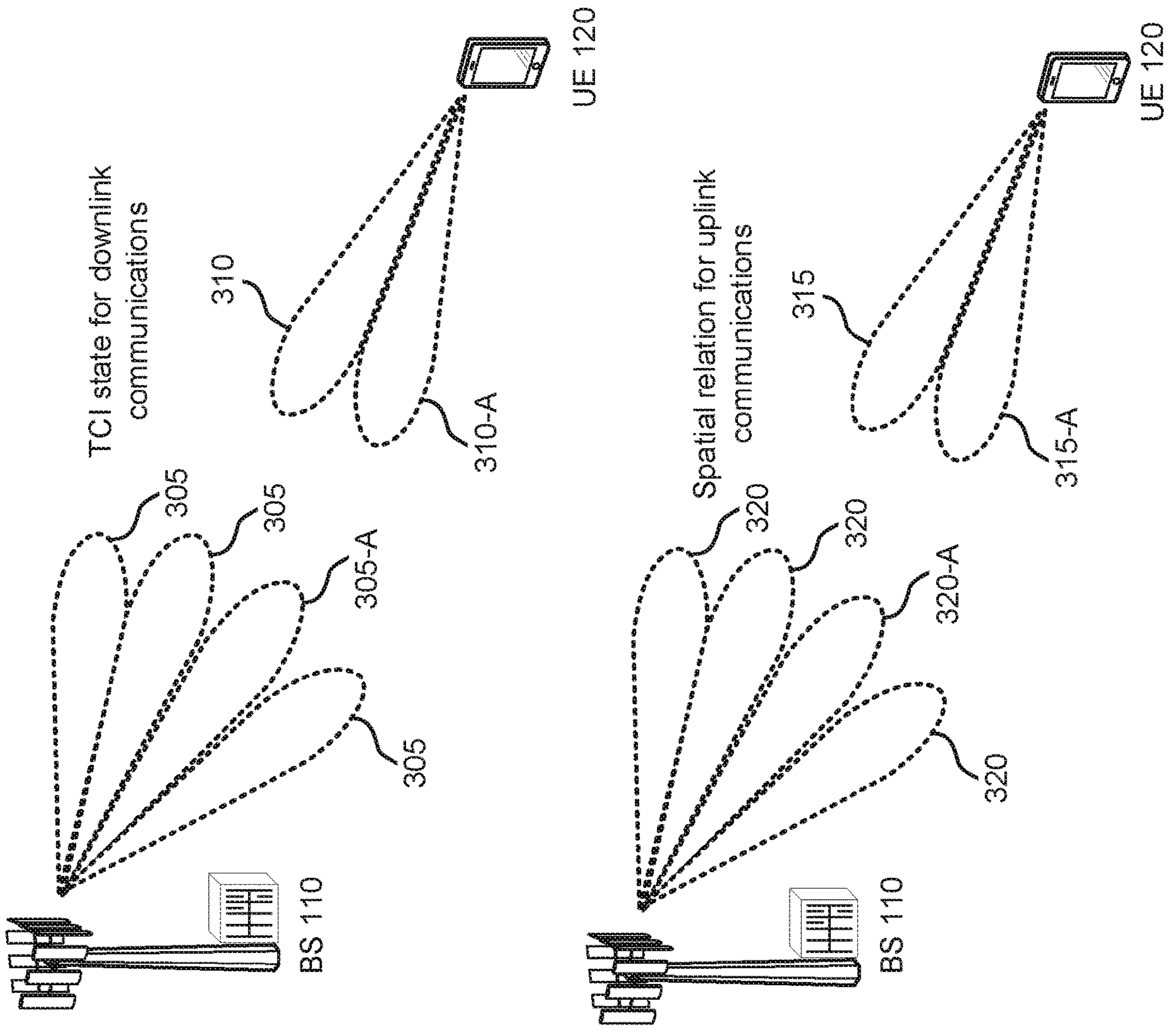
FIG. 3 is a diagram illustrating an example of using beams for communications between a base station and a UE, in accordance with the present disclosure.

FIG. 3 is a diagram illustrating an example of using beams for communications between a base station and a UE, in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may use a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a TC state. A TC state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink RS set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TC states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

3GPP standards Release 17 is establishing a unified TC state framework in which a TCI state may be used to indicate more than one beam. The TCI state may be used to indicate beams for a downlink channel or RS and/or an uplink channel or RS. There may be multiple types of unified TC states. For example, a joint downlink/uplink common TCI state may indicate a common beam for at least one downlink channel or RS and at least one uplink channel or RS. A separate downlink common TCI state may indicate a common beam for more than one downlink channel or RS. A separate uplink common TCI state may indicate a common beam for more than one uplink channel or RS. Other types of unified TCI states may include a separate downlink single channel or RS TCI state that indicates a beam for a single downlink channel or RS, a separate uplink single channel or RS TCI state that indicates a beam for a single uplink channel or RS, or an uplink spatial relation information, such as a spatial relation indicator (SRI), that indicates a beam for a single uplink channel or RS.

Each channel or RS is to have a beam indicated with a TC state or a spatial relation associated with a TC state after an RRC connection. A base station may indicate a beam (TCI state) to a UE, or the UE may indicate a beam to the base station. However, indicating a TCI state for every beam for a channel or RS adds overhead that consumes signaling resources. Furthermore, if the UE does not receive an indication of the TCI state for a channel or RS (or receive information that can be used to determine the TCI state), the UE may not use an optimal beam for the channel or RS. This may degrade communications or add latency to the communications for the channel or RS. Degraded communications consume additional processing resources and signaling resources. Some indications of TCI states for the channel or RS may not be timely. For example, there may be a scheduling time offset between when a TC state is indicated and when the UE is to use the TCI state for the channel or RS, such as for an aperiodic CSI. However, the offset may be less than a beam switching time for the UE and thus the UE is not able to switch in time.

Various aspects relate generally to selecting a TCI state if an indication of a TCI state (or QCL information for determining the TCI state) is not received or is absent for a channel or RS. Some aspects more specifically relate to selecting a particular TCI state for a channel or RS in a BWP. For example, a wireless communication device, such as a UE, may select, as a TCI state for the channel or RS, a TC state associated with a TC list received in an RRC message for the BWP, a TC state associated with a codepoint ID activated by a MAC CE for the BWP, or a TC state associated with a scheduling DCI for the channel or RS. The selected TCI state for the channel or RS may be a different TCI state than a default TCI state for which the wireless communication device may be configured.

In some aspects, the wireless communication device may select a TCI state indicated by the latest DCI (with a TC indication) for the channel or RS, which has not received a TCI state indication. For example, the wireless communication device may select a TCI state for aperiodic CSI-RS resources that may be used for CSI acquisition, such as a channel measurement resource setting configured without a higher layer parameter “repetition” and without a higher layer “trs-info”. The selected TCI state may be the TCI state that is indicated in a TCI indication DCI for UE-dedicated reception on a PDSCH and for UE-dedicated reception on all CORESETs or a subset of CORESETs (fewer than all of the CORESETs). In some other examples, the wireless communication device may select a TC state for aperiodic CSI-RS resources configured for beam management, such as a channel measurement resource setting is configured with a higher layer parameter “repetition”. The selected TCI state may be the TCI state that is indicated in a TCI indication DCI for UE-dedicated reception on a PDSCH and for UE-dedicated reception on all CORESETs or a subset of CORESETs (fewer than all CORESETs). The TCI indication DCI may be the latest DCI with a TCI indication field for which the wireless communication device has transmitted a confirmation, and the aperiodic CSI-RS resources configured for CSI acquisition or aperiodic CSI-RS resources configured for beam management may be not configured or indicated with any TCI state.

In some aspects, the wireless communication device may select a first TCI state in the TCI list or the TCI state with the lowest TCI state ID. In some aspects, selecting the TCI state associated with the codepoint ID may include selecting the TC state for a first codepoint with a TC state ID activated by the MAC CE or the TCI state with the lowest codepoint ID activated by the MAC CE.

Particular aspects of the subject matter described in this disclosure can be implemented to realize one or more of the following potential advantages. In some examples, the described techniques can be used to reduce signaling overhead that is caused by the base station (or the UE) transmitting an indication of a TCI state for each beam. The reduction of signaling overhead causes the base station and the UE to conserve signaling resources and processing resources. By selecting a particular TCI state if a beam indication is not received, the base station and the UE my also select a more optimal beam that will help to avoid degraded communications.

Figure 4:
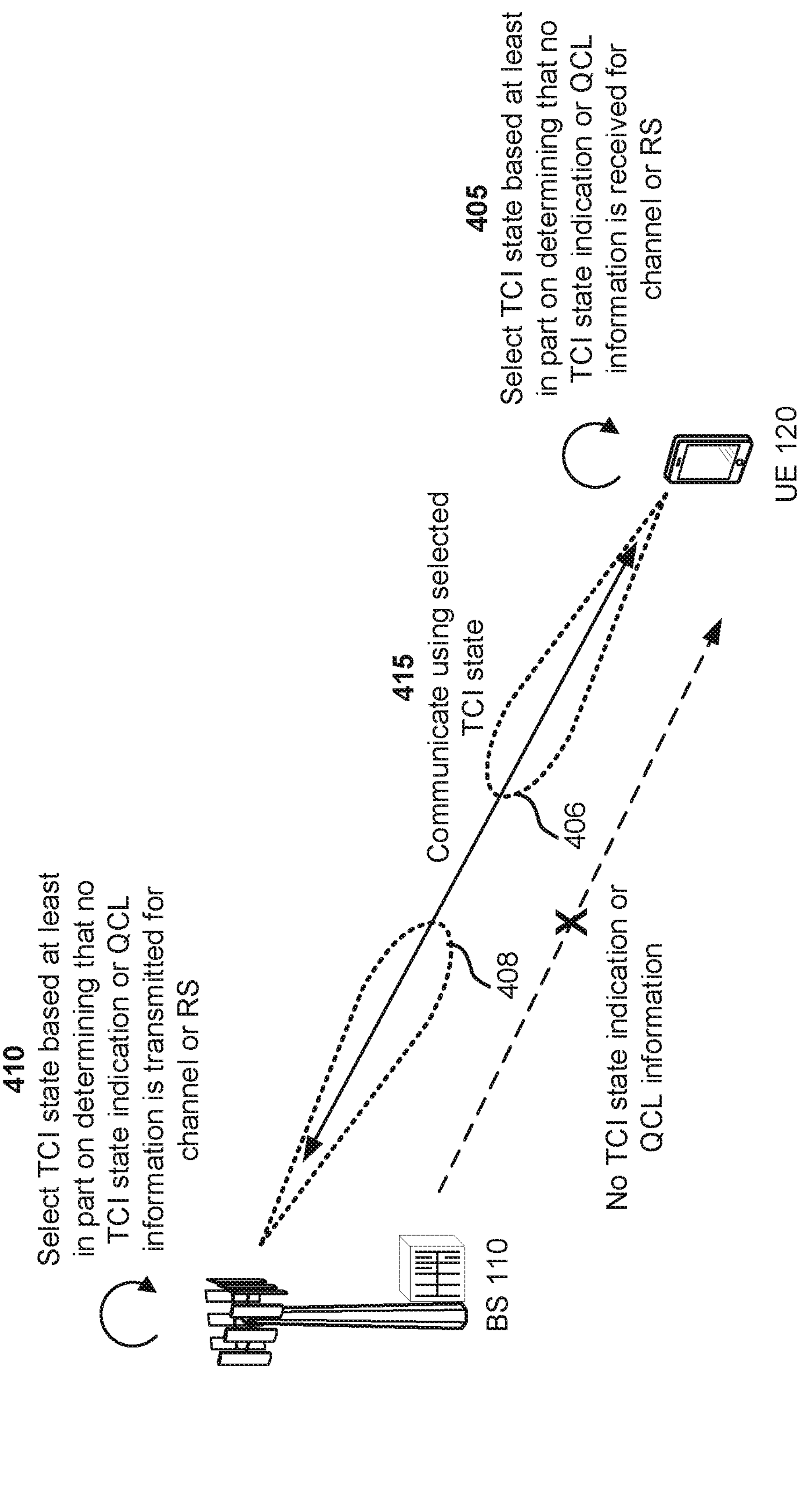
FIG. 4 is a diagram illustrating an example of selecting a transmission configuration indicator state, in accordance with the present disclosure.

FIG. 4 is a diagram illustrating an example of selecting a TCI state, in accordance with the present disclosure. A base station, such as base station 110, may communicate with a UE, such as UE 120.

FIG. 4 shows that the UE 120 has not received an indication of a TC state for a beam that the UE 120 is to use for a channel or RS. The UE 120 may also have not received QCL information that can be used to determine the TCI state. The QCL information may indicate a beam-pair relationship between a TCI state that is to be used and an existing spatial relation of which the UE 120 is aware. If the UE 120 receives the QCL information, the UE 120 may be able to use stored relationship information to identify the TCI state associated with the received QCL information. The UE 120 may have established a connection on a channel with the base station 110 via RRC signaling or may be ready to use an RS. However, in FIG. 4, the UE 120 has not yet received any indication of which TC state to use for the channel or RS. The channel or RS may be a downlink channel or RS in a BWP or an uplink channel or RS in the BWP.

In a first operation 405, the UE 120 may select a TC state for the channel or RS based at least in part on determining that the UE 120 has not received an indication of the TCI state for the channel or RS and has not received QCL information that is used for determining the TCI state for the channel or RS. The selected TCI state may be used to form a transmit beam 406 or a receive beam 408. The UE 120 may determine that the UE 120 is not configured with the TC state or with QCL information. In some aspects, the UE 120 may select the TCI state for the channel or RS based at least in part on a rule rather than an indication. For example, the UE 120 may select, as the TCI state for the channel or RS, a TC state associated with a TC list. The UE 120 may have received the TCI list in an RRC message. The UE 120 may select a first TC state in the list, or the UE 120 may select a TCI state with the lowest TCI state ID in the list. Alternatively, the UE 120 may select a last TCI state in the TCI list, a TCI state with the highest TCI state ID in the list, or another specified TCI state in the TCI list. Selection of a TCI state from the TC list may be applicable to CSI-RSs for CSI acquisition. Selection of a TC state from the TCI list may also be applicable to any channel or RS before the channel or RS is activated with a TCI state after RRC configuration.

In some aspects, the UE 120 may select, as the TCI state for the channel or RS, a TC state associated with a TC codepoint ID that is activated by a MAC CE. The TCI codepoint ID may correspond to a TCI codepoint that indicates information such as an activated TI state. The codepoint ID may be associated with a TCI state activated with a MAC CE. The UE 120 may select the associated TC state for the channel or RS. This selection may be applicable to aperiodic CSI-RS for CSI acquisition, aperiodic CSI-RS for beam management, a sounding reference signal (SRS) for codebook-based MIMO, or an SRS for non-codebook-based MIMO.

In some aspects, the UE 120 may select, as the TCI state for the channel or RS, the TCI state of a scheduling DCI. The scheduling DCI may include an DCI scheduling, activating, or triggering the channel or RS. The UE 120 may select the TCI state that is used to receive the scheduling DCI, even if a scheduling time offset between the DCI and the channel or RS is larger than a beam switching time for the UE 120, such as a parameter timedurationforQCL or beamswitchingrime. In some aspects, if the scheduling time offset for an aperiodic CSI is greater than the beam switching time for the UE 120, the beam for the aperiodic CSI may follow the beam of the scheduling DCI. This selection may also be applicable to aperiodic CSI for CSI acquisition or aperiodic CSI-RS resources configured for beam management.

In some aspects, the UE 120 may be configured with separate downlink and uplink TCI states by RRC signaling. The UE 120 may select a TCI state for the downlink channel or RS only within the TC states applicable to the downlink channel or RS. The UE 120 may select a TCI state for the uplink channel or RS only within the TCI states applicable to the uplink channel or RS. The TCI state may be a unified TCI state that is common to both the uplink and the downlink. The UE 120 may select another TCI state for the uplink TCI state based at least in part on a rule or information that applies to the uplink TCI state.

In some aspects, the UE 120 may be configured for communication with multiple TRPs (multi-TRP) or for inter-cell beam management by RRC signaling. The UE 120 may select a TCI state from among TCI states that are used to transmit or receive communications using the same TRP ID, control resource set (CORESET) pool index, or physical cell (PCI) as the TRP ID, CORESET pool index, or PCI associated with the channel or RS.

In some aspects, if the channel or RS is an uplink channel or RS, the UE 120 may determine power control parameters for the uplink channel or RS based at least in part on power control parameters that are associated with the selected TCI and the channel type. Multiple sets of power control parameters, which may include P0, alpha, closed loop index, or pathloss RS (PLRS), may be associated with the selected TCI state. Each set of power control parameters may be applied to a channel type. For example, the UE 120 may use a first set of power control parameters for a physical uplink control channel (PUCCH), a second set of power control parameters for a physical uplink shared channel (PUSCH), and a third set of power control parameters for an SRS.

The base station 110 may follow the same rule for selecting TCI states as the UE 120. In a second operation 410, which may occur before, during or after the first operation 405, the base station 110 may select a TC state that the UE 120 is expected to use for the channel or RS based at least in part on determining that the base station 110 has not transmitted, to the UE 120, an indication of a TCI state or QCL information for the channel or RS. The base station 110 may select, as the TCI state for the UE to use for the channel or RS, a TCI state associated with a TCI list, a codepoint ID activated by a MAC CE, or scheduling DCI, as described in connection with the first operation 405.

In a third operation 415, the base station 110 and the UE may communicate using the selected TCI state. This may include the base station 110 transmitting a communication on beam 408 configured with the selected TCI state and the UE 120 receiving the communication using beam 406 with the selected TCI state. This may include the UE 120 transmitting a communication on beam 406 with the selected TCI state and the base station 110 receiving the communication on beam 406 with the selected TCI state.

Figure 5:
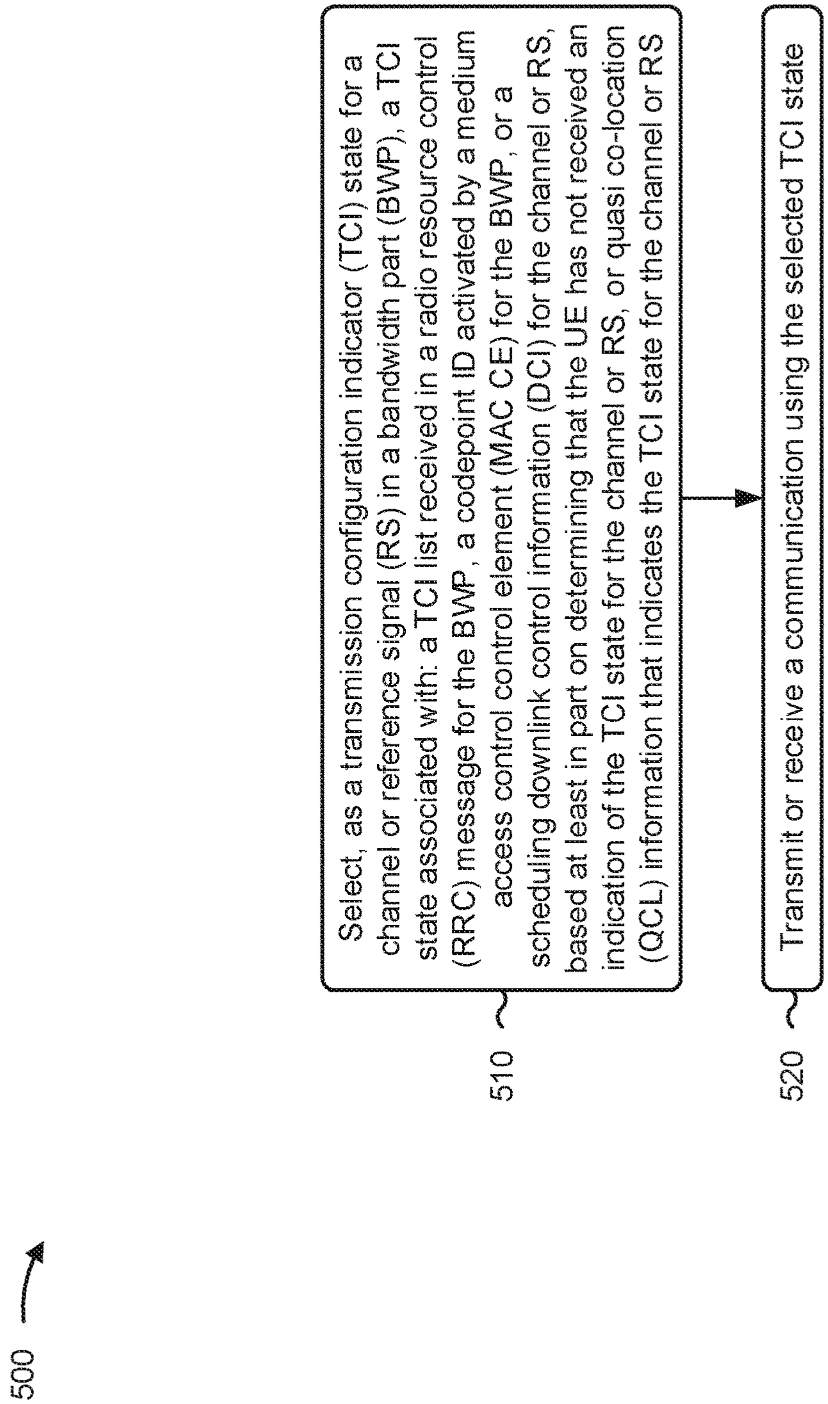
FIG. 5 is a flowchart illustrating an example process performed, for example, by a UE, in accordance with the present disclosure.

FIG. 5 is a flowchart illustrating an example process 500 performed, for example, by a UE in accordance with the present disclosure. Example process 500 is an example where the UE (for example, UE 120) performs operations associated with selecting a TCI state if no TCI state indication is received.

As shown in FIG. 5, in some aspects, process 500 may include selecting, as a TCI state for a channel or RS in a BWP, a TC state associated with: a TCI list received in an RRC message for the BWP, a codepoint ID activated by a MAC CE for the BWP, or a scheduling DCI for the channel or RS, based at least in part on determining that the UE has not received an indication of the TCI state for the channel or RS, or QCL information that indicates the TC state for the channel or RS (block 510). For example, the UE (such as by using communication manager 140 or selection component 708 depicted in FIG. 7) may select, as a TC state for a channel or RS in a BWP, a TCI state associated with: a TCI list received in an RRC message for the BWP, a codepoint ID activated by a MAC CE for the BWP, or a scheduling DCI for the channel or RS, based at least in part on determining that the UE has not received an indication of the TCI state for the channel or RS, or QCL information that indicates the TCI state for the channel or RS, as described above.

As further shown in FIG. 5, in some aspects, process 500 may include transmitting or receiving a communication using the selected TCI state (block 520). For example, the UE (such as by using communication manager 140, reception component 702, or transmission component 704 depicted in FIG. 7) may transmit or receive a communication using the selected TCI state, as described above.

Process 500 may include additional aspects, such as any single aspect or any combination of aspects described below or in connection with one or more other processes described elsewhere herein.

In a first additional aspect, the TCI state associated with the TC list is a first TCI state in the TCI list or a TCI state with a lowest TC state ID in the TCI list.

In a second additional aspect, alone or in combination with the first aspect, the codepoint ID corresponds to a first codepoint with a TCI state activated by the MAC CE.

In a third additional aspect, alone or in combination with one or more of the first and second aspects, the codepoint ID is a lowest codepoint ID activated by the MAC CE.

In a fourth additional aspect, alone or in combination with one or more of the first through third aspects, a scheduling time offset for the scheduling DCI is greater than a beam switching time for the UE.

In a fifth additional aspect, alone or in combination with one or more of the first through fourth aspects, the selected TCI state is a unified TCI state that indicates a common beam for at least one downlink channel or RS and at least one uplink channel or RS.

In a sixth additional aspect, alone or in combination with one or more of the first through fifth aspects, the selected TCI state is a unified TCI state that indicates a common beam for more than one downlink channel or RS or more than one uplink channel or RS.

In a seventh additional aspect, alone or in combination with one or more of the first through sixth aspects, the selected TCI state is for a downlink channel or RS and is separate from a TC state for an uplink channel or RS.

In an eighth additional aspect, alone or in combination with one or more of the first through seventh aspects, the selected TCI state is for an uplink channel or RS and is separate from a TCI state for a downlink channel or RS.

In a ninth additional aspect, alone or in combination with one or more of the first through eighth aspects, selecting the TCI state includes selecting a TCI state from among TCI states that are used to transmit or receive communications using a TRP ID, a CORESET pool index, or a PCI associated with the channel or RS.

In a tenth additional aspect, alone or in combination with one or more of the first through ninth aspects, the selected TC state is for an uplink channel or RS, and process 500 includes selecting power control parameters for transmission of the communication based at least in part on power control parameters associated with the selected TCI state and a type of the uplink channel.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
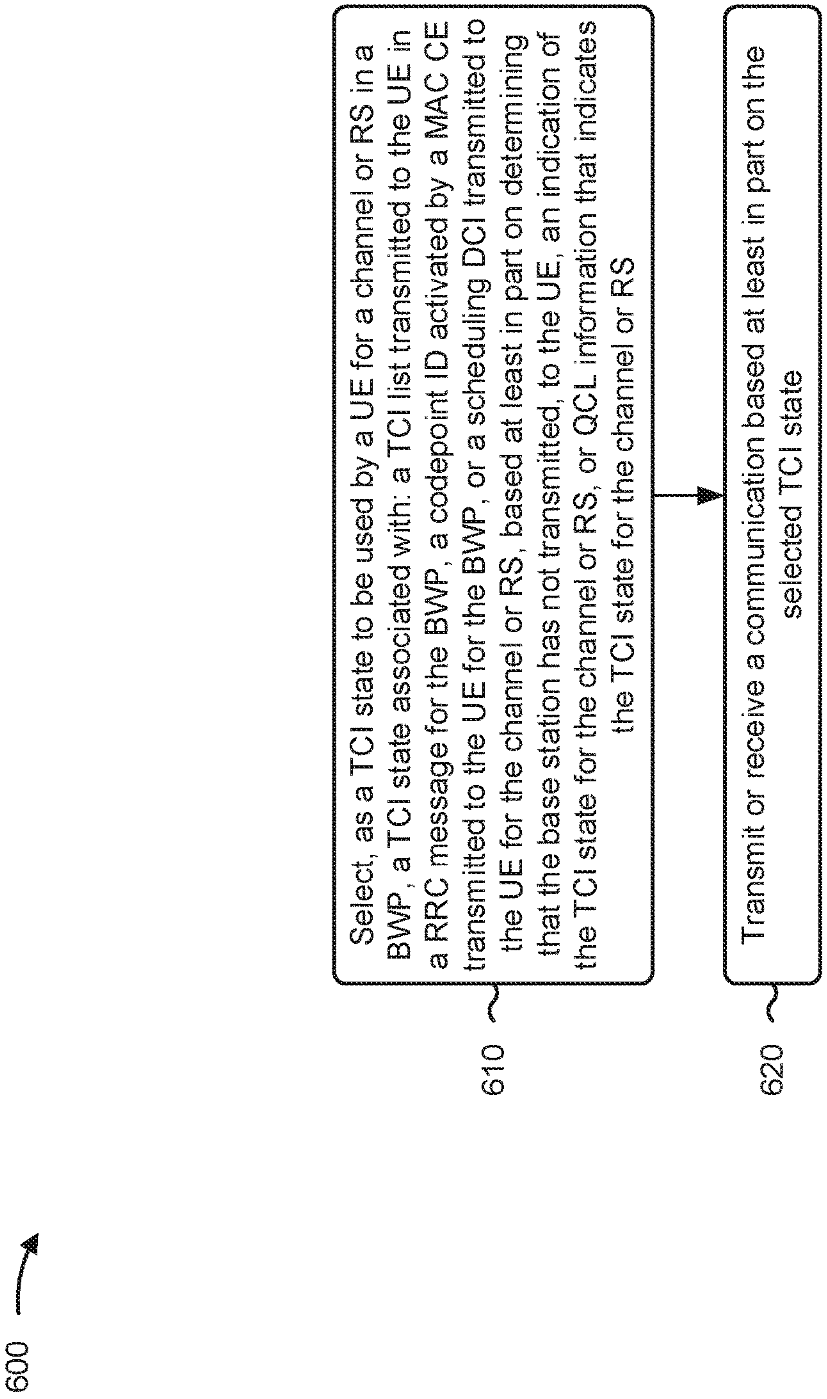
FIG. 6 is a flowchart illustrating an example process performed, for example, by a base station in accordance, with the present disclosure.

FIG. 6 is a flowchart illustrating an example process 600 performed, for example, by a base station in accordance with the present disclosure. Example process 600 is an example where the base station (for example, base station 110) performs operations associated with selecting a TCI state that a UE is to use if a TC state indication is not transmitted to the UE.

As shown in FIG. 6, in some aspects, process 600 may include selecting, as a TCI state to be used by a UE for a channel or RS in a BWP, a TCI state associated with: a TCI list transmitted to the UE in an RRC message for the BWP, a codepoint ID activated by a MAC CE transmitted to the UE for the BWP, or a scheduling DC transmitted to the UE for the channel or RS, based at least in part on determining that the base station has not transmitted, to the UE, an indication of the TCI state for the channel or RS, or QCL information that indicates the TCI state for the channel or RS (block 610). For example, the base station (such as by using communication manager 150 or selection component 808 depicted in FIG. 8) may select, as a TCI state to be used by a UE for a channel or RS in a BWP, a TC state associated with: a TCI list transmitted to the UE in an RRC message for the BWP, a codepoint ID activated by a MAC CE transmitted to the UE for the BWP, or a scheduling DCI transmitted to the UE for the channel or RS, based at least in part on determining that the base station has not transmitted, to the UE, an indication of the TCI state for the channel or RS, or QCL information that indicates the TCI state for the channel or RS, as described above.

As further shown in FIG. 6, in some aspects, process 600 may include transmitting or receiving a communication based at least in part on the selected TCI state (block 620). For example, the base station (such as by using communication manager 150, reception component 802, or transmission component 804 depicted in FIG. 8) may transmit or receive a communication based at least in part on the selected TCI state, as described above.

Process 600 may include additional aspects, such as any single aspect or any combination of aspects described below or in connection with one or more other processes described elsewhere herein.

In a first additional aspect, the TCI state associated with the TCI list is a first TCI state in the TCI list or a TCI state with a lowest TCI state ID in the TCI list.

In a second additional aspect, alone or in combination with the first aspect, the codepoint ID corresponds to a first codepoint with a TCI state activated by the MAC CE.

In a third additional aspect, alone or in combination with one or more of the first and second aspects, the codepoint ID is a lowest codepoint ID activated by the MAC CE.

In a fourth additional aspect, alone or in combination with one or more of the first through third aspects, a scheduling time offset for the scheduling DCI is greater than a beam switching time for the UE.

In a fifth additional aspect, alone or in combination with one or more of the first through fourth aspects, the selected TCI state is a unified TCI state that indicates a common beam for at least one downlink channel or RS and at least one uplink channel or RS.

In a sixth additional aspect, alone or in combination with one or more of the first through fifth aspects, the selected TCI state is a unified TCI state that indicates a common beam for more than one downlink channel or RS or more than one uplink channel or RS.

In a seventh additional aspect, alone or in combination with one or more of the first through sixth aspects, the selected TCI state is for a downlink channel or RS and is separate from a TC state for an uplink channel or RS.

In an eighth additional aspect, alone or in combination with one or more of the first through seventh aspects, the selected TCI state is for an uplink channel or RS and is separate from a TCI state for a downlink channel or RS.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
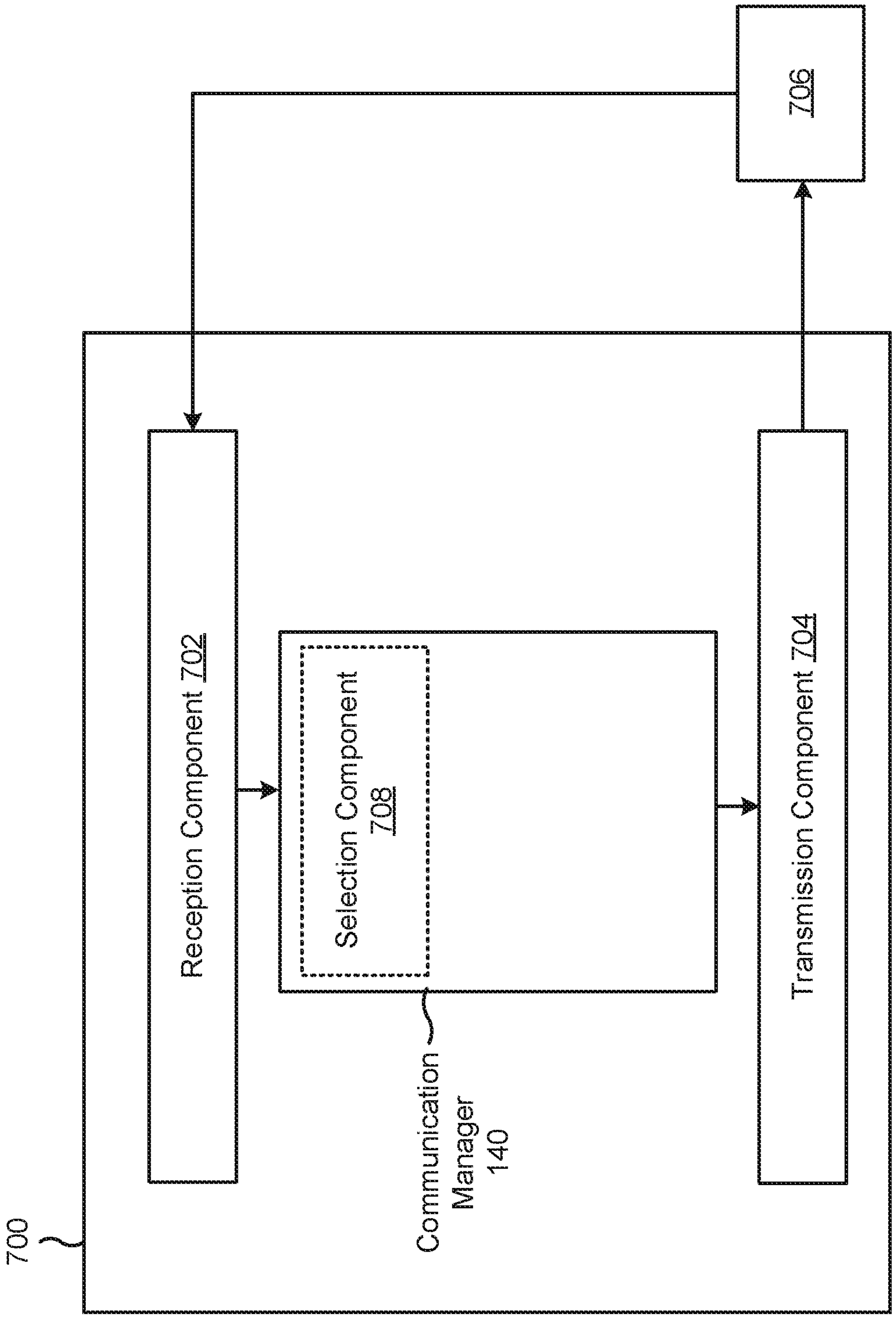
FIGS. 7-8 are diagrams of example apparatuses for wireless communication in accordance, with the present disclosure.

FIG. 7 is a diagram of an example apparatus 700 for wireless communication. The apparatus 700 may be a UE, such as UE 120, or a UE may include the apparatus 700. In some aspects, the apparatus 700 includes a reception component 702 and a transmission component 704, which may be in communication with one another (for example, via one or more buses or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a selection component 708, among other examples. The apparatus 700 may select a TCI state if no TC state is configured, if no TCI indication is received, and no QCL assumption information is received.

In some aspects, the apparatus 700 may be configured to perform one or more operations described herein in connection with FIGS. 1-4. Additionally or alternatively, the apparatus 700 may be configured to perform one or more processes described herein, such as process 500 of FIG. 5. In some aspects, the apparatus 700 or one or more components shown in FIG. 7 may include one or more components of the UE described in connection with FIG. 2. Additionally or alternatively, one or more components shown in FIG. 7 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The selection component 708 may select, as a TC state for a channel or RS in a BWP, a TCI state associated with: a TCI list received in an RRC message for the BWP, a codepoint ID activated by a MAC CE for the BWP, or a scheduling DCI for the channel or RS, based at least in part on determining that the UE has not received an indication of the TCI state for the channel or RS, or QCL information that indicates the TCI state for the channel or RS. The transmission component 704 may transmit or receive a communication using the selected TCI state.

In some aspects, the selection component 708 may select a first TC state in the TCI list or the TCI state with the lowest TCI state ID. In some aspects, the selection component 708 may select the TC state for a first codepoint with a TCI state ID activated by the MAC CE or the TCI state with the lowest codepoint ID activated by the MAC CE.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
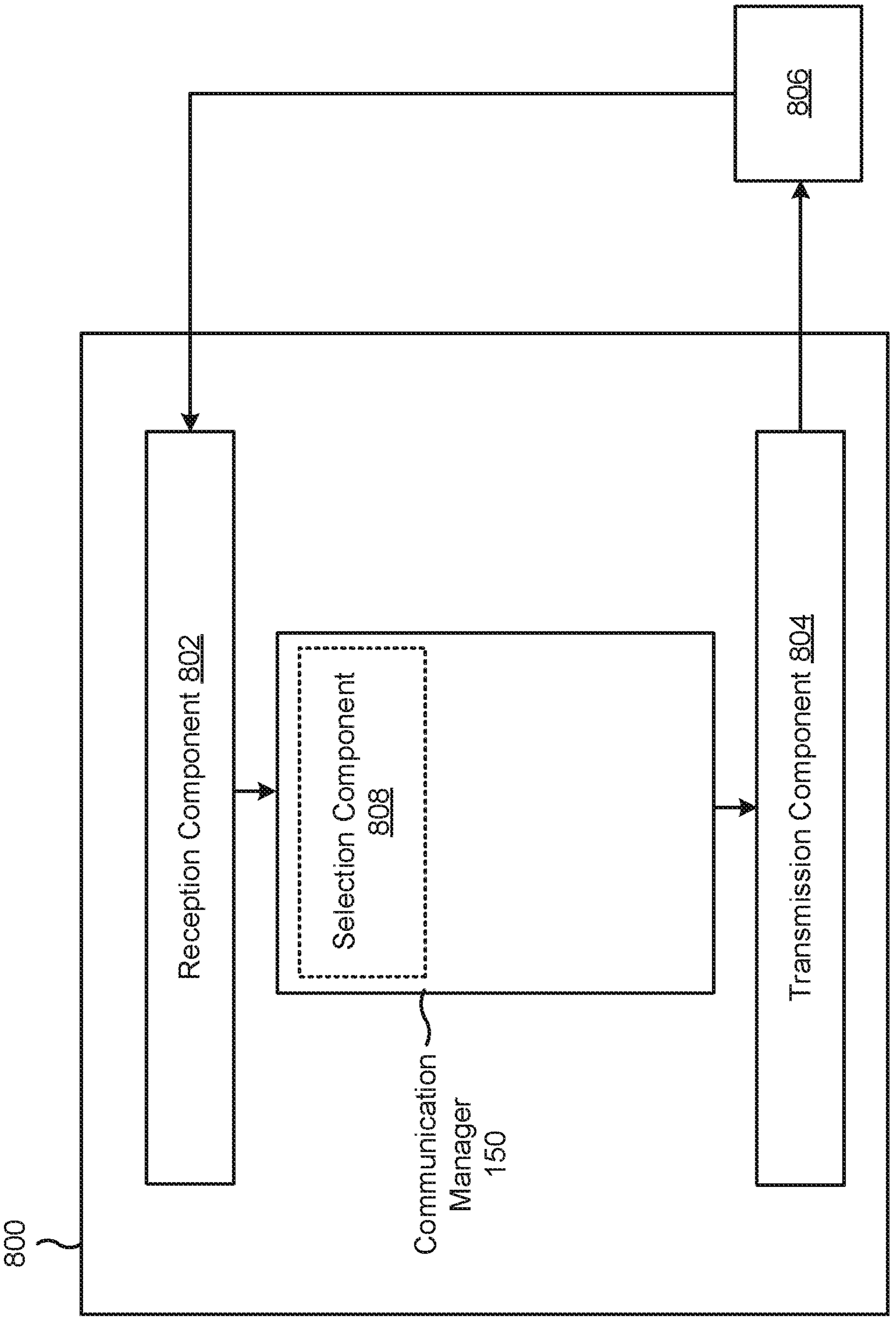

FIG. 8 is a diagram of an example apparatus 800 for wireless communication. The apparatus 800 may be a base station, such as base station 110), or a base station may include the apparatus 800. In some aspects, the apparatus 800 includes a reception component 802 and a transmission component 804, which may be in communication with one another (for example, via one or more buses or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a selection component 808, among other examples. The apparatus 800 may select a TC state that the other apparatus 806 is expected to use if the other apparatus 806 is not configured with a TC state, if no TC indication has been transmitted to the other apparatus 806, and if no QCL assumption information has been transmitted to the other apparatus 806.

In some aspects, the apparatus 800 may be configured to perform one or more operations described herein in connection with FIGS. 1-4. Additionally or alternatively, the apparatus 800 may be configured to perform one or more processes described herein, such as process 600 of FIG. 6. In some aspects, the apparatus 800 or one or more components shown in FIG. 8 may include one or more components of the base station described in connection with FIG. 2. Additionally or alternatively, one or more components shown in FIG. 8 may be implemented within one or more components described in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The selection component 808 may select, as a TCI state to be used by a UE for a channel or RS in a BWP, a TCI state associated with: a TC list transmitted to the UE in an RRC message for the BWP, a codepoint ID activated by a MAC CE transmitted to the UE for the BWP, or a scheduling DCI transmitted to the UE for the channel or RS, based at least in part on determining that the base station has not transmitted, to the UE, an indication of the TC state for the channel or RS, or QCL information that indicates the TCI state for the channel or RS. The transmission component 804 may transmit or receive a communication based at least in part on the selected TCI state.

In some aspects, the selection component 808 may select a first TCI state in the TCI list or the TCI state with the lowest TCI state ID. In some aspects, the selection component 808 may select the TCI state for a first codepoint with a TCI state ID activated by the MAC CE or the TCI state with the lowest codepoint ID activated by the MAC CE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: selecting, as a transmission configuration indicator (TCI) state for a channel or reference signal (RS) in a bandwidth part (BWP), a TC state associated with: a TCI list received in a radio resource control (RRC) message for the BWP; a codepoint identifier (ID) activated by a medium access control control element (MAC CE) for the BWP; or a scheduling downlink control information (DCI) for the channel or RS, based at least in part on determining that the UE has not received an indication of the TCI state for the channel or RS, or quasi co-location (QCL) information that indicates the TCI state for the channel or RS; and transmitting or receiving, by the UE, a communication using the selected TC state.

Aspect 2: The method of Aspect 1, wherein the TCI state associated with the TCI list is a first TCI state in the TCI list or a TCI state with a lowest TCI state ID in the TCI list.

Aspect 3: The method of Aspect 1 or 2, wherein the codepoint ID corresponds to a first codepoint with a TC state activated by the MAC CE.

Aspect 4: The method of Aspect 1 or 2, wherein the codepoint ID is a lowest codepoint ID activated by the MAC CE.

Aspect 5: The method of any of Aspects 1-4, wherein a scheduling time offset for the scheduling DCI is greater than a beam switching time for the UE.

Aspect 6: The method of any of Aspects 1-5, wherein the selected TC state is a unified TCI state that indicates a common beam for at least one downlink channel or RS and at least one uplink channel or RS.

Aspect 7: The method of any of Aspects 1-5, wherein the selected TCI state is a unified TCI state that indicates a common beam for more than one downlink channel or RS or more than one uplink channel or RS.

Aspect 8: The method of any of Aspects 1-5, wherein the selected TC state is for a downlink channel or RS and is separate from a TCI state for an uplink channel or RS.

Aspect 9: The method of any of Aspects 1-5, wherein the selected TCI state is for an uplink channel or RS and is separate from a TCI state for a downlink channel or RS.

Aspect 10: The method of any of Aspects 1-9, wherein selecting the TCI state includes selecting a TCI state from among TCI states that are used to transmit or receive communications using a TRP ID, a control resource set (CORESET) pool index, or a physical cell ID (PCI) associated with the channel or RS.

Aspect 11: The method of any of Aspects 1-7 and 9-10, wherein the selected TCI state is for an uplink channel or RS, and wherein the method includes selecting power control parameters for transmission of the communication based at least in part on power control parameters associated with the selected TC state and a type of the uplink channel.

Aspect 12: A method of wireless communication performed by abase station, comprising: selecting, as a transmission configuration indicator (TCI) state to be used by a user equipment (UE) for a channel or reference signal (RS) in a bandwidth part (BWP), a TCI state associated with: a TCI list transmitted to the UE in a radio resource control (RRC) message for the BWP; a codepoint identifier (ID) activated by a medium access control control element (MAC CE) transmitted to the UE for the BWP; or a scheduling downlink control information (DCI) transmitted to the UE for the channel or RS, based at least in part on determining that the base station has not transmitted, to the UE, an indication of the TCI state for the channel or RS, or quasi co-location (QCL) information that indicates the TC state for the channel or RS; and transmitting or receiving, by the base station, a communication based at least in part on the selected TCI state.

Aspect 13: The method of Aspect 12, wherein the TCI state associated with the TCI list is a first TCI state in the TC list or a TCI state with a lowest TC state ID in the TCI list.

Aspect 14: The method of Aspect 12 or 13, wherein the codepoint ID corresponds to a first codepoint with a TC state activated by the MAC CE.

Aspect 15: The method of Aspect 12 or 13, wherein the codepoint ID is a lowest codepoint ID activated by the MAC CE.

Aspect 16: The method of any of Aspects 12-15, wherein a scheduling time offset for the scheduling DCI is greater than a beam switching time for the UE.

Aspect 17: The method of any of Aspects 12-16, wherein the selected TCI state is a unified TCI state that indicates a common beam for at least one downlink channel or RS and at least one uplink channel or RS.

Aspect 18: The method of any of Aspects 12-16, wherein the selected TC state is a unified TCI state that indicates a common beam for more than one downlink channel or RS or more than one uplink channel or RS.

Aspect 19: The method of any of Aspects 12-16, wherein the selected TC state is for a downlink channel or RS and is separate from a TCI state for an uplink channel or RS.

Aspect 20: The method of any of Aspects 12-16, wherein the selected TCI state is for an uplink channel or RS and is separate from a TCI state for a downlink channel or RS.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

at least one processor; and at least one memory coupled with the at least one processor and storing processor-readable code that, when executed by the at least one processor, is configured to cause the UE to:

select, as a transmission configuration indicator (TCI) state for a channel or reference signal (RS) in a bandwidth part (BWP), based at least in part on determining that the UE has not received an indication of a TCI state for the channel or RS, or quasi co-location (QCL) information that indicates the TCI state for the channel or RS, the TCI state associated with:

a TCI list received in a radio resource control (RRC) message for the BWP;

a codepoint identifier (ID) activated by a medium access control control element (MAC CE) for the BWP; or a scheduling downlink control information (DCI) for the channel or RS; and transmit or receive a communication using the selected TCI state.

2. The UE of claim 1, wherein the TCI state associated with the TCI list is a first TCI state in the TCI list or a TCI state with a lowest TCI state ID in the TCI list.

3. The UE of claim 1, wherein the codepoint ID corresponds to a first codepoint with a TCI state activated by the MAC CE.

4. The UE of claim 1, wherein the codepoint ID is a lowest codepoint ID activated by the MAC CE.

5. The UE of claim 1, wherein a scheduling time offset for the scheduling DCI is greater than a beam switching time for the UE.

6. The UE of claim 1, wherein the selected TCI state is a unified TCI state that indicates a common beam for at least one downlink channel or RS and at least one uplink channel or RS.

7. The UE of claim 1, wherein the selected TCI state is a unified TCI state that indicates a common beam for more than one downlink channel or RS or more than one uplink channel or RS.

8. The UE of claim 1, wherein the selected TCI state is for a downlink channel or RS and is separate from a TCI state for an uplink channel or RS.

9. The UE of claim 1, wherein the selected TCI state is for an uplink channel or RS and is separate from a TCI state for a downlink channel or RS.

10. The UE of claim 1, wherein, to cause the UE to select the TCI state for the channel or RS, the processor-readable code, when executed by the at least one processor, is configured to cause the UE to select a TCI state for the channel or RS from among TCI states that are used to transmit or receive communications using a transmit receive point (TRP) ID, a control resource set (CORESET) pool index, or a physical cell ID (PCI) associated with the channel or RS.

11. The UE of claim 1, wherein the selected TCI state is for an uplink channel or RS, and the processor-readable code, when executed by the at least one processor, is configured to cause the UE select power control parameters for transmission of the communication based at least in part on power control parameters associated with the selected TCI state and a type of the uplink channel.

12. A network entity for wireless communication, comprising:

at least one processor; and at least one memory communicatively coupled with the at least one processor and storing processor-readable code that, when executed by the at least one processor, is configured to cause the network entity to:

select, as a transmission configuration indicator (TCI) state to be used by a user equipment (UE) for a channel or reference signal (RS) in a bandwidth part (BWP), based at least in part on determining that the network entity has not transmitted, to the UE, an indication of a TCI state for the channel or RS, or quasi co-location (QCL) information that indicates the TCI state for the channel or RS, the TCI state associated with:

a TCI list transmitted to the UE in a radio resource control (RRC) message for the BWP;

a codepoint identifier (ID) activated by a medium access control control element (MAC CE) transmitted to the UE for the BWP; or a scheduling downlink control information (DCI) transmitted to the UE for the channel or RS; and transmit or receive a communication based at least in part on the selected TCI state.

13. The network entity of claim 12, wherein the TCI state associated with the TCI list is a first TCI state in the TCI list or a TCI state with a lowest TCI state ID in the TCI list.

14. The network entity of claim 12, wherein the codepoint ID corresponds to a first codepoint with a TCI state activated by the MAC CE.

15. The network entity of claim 12, wherein the codepoint ID is a lowest codepoint ID activated by the MAC CE.

16. The network entity of claim 12, wherein a scheduling time offset for the scheduling DCI is greater than a beam switching time for the UE.

17. The network entity of claim 12, wherein the selected TCI state is a unified TCI state that indicates a common beam for at least one downlink channel or RS and at least one uplink channel or RS.

18. The network entity of claim 12, wherein the selected TCI state is a unified TCI state that indicates a common beam for more than one downlink channel or RS or more than one uplink channel or RS.

19. The network entity of claim 12, wherein the selected TCI state is for a downlink channel or RS and is separate from a TCI state for an uplink channel or RS.

20. The network entity of claim 12, wherein the selected TCI state is for an uplink channel or RS and is separate from a TCI state for a downlink channel or RS.

21. A method of wireless communication performed by a user equipment (UE), comprising:

selecting, as a transmission configuration indicator (TCI) state for a channel or reference signal (RS) in a bandwidth part (BWP), based at least in part on determining that the UE has not received an indication of a TCI state for the channel or RS, or quasi co-location (QCL) information that indicates the TCI state for the channel or RS, the TCI state associated with:

a TCI list received in a radio resource control (RRC) message for the BWP;

a codepoint identifier (ID) activated by a medium access control control element (MAC CE) for the BWP; or a scheduling downlink control information (DCI) for the channel or RS; and transmitting or receiving, by the UE, a communication using the selected TCI state.

22. The method of claim 21, wherein the TCI state associated with the TCI list is a first TCI state in the TCI list or a TCI state with a lowest TCI state ID in the TCI list.

23. The method of claim 21, wherein the codepoint ID corresponds to a first codepoint with a TCI state activated by the MAC CE.

24. The method of claim 21, wherein the codepoint ID is a lowest codepoint ID activated by the MAC CE.

25. A method of wireless communication performed by a network entity, comprising:

selecting, as a transmission configuration indicator (TCI) state to be used by a user equipment (UE) for a channel or reference signal (RS) in a bandwidth part (BWP), based at least in part on determining that the network entity has not transmitted, to the UE, an indication of a TCI state for the channel or RS, or quasi co-location (QCL) information that indicates the TCI state for the channel or RS, the TCI state associated with:

a TCI list transmitted to the UE in a radio resource control (RRC) message for the BWP;

a codepoint identifier (ID) activated by a medium access control control element (MAC CE) transmitted to the UE for the BWP; or a scheduling downlink control information (DCI) transmitted to the UE for the channel or RS; and transmitting or receiving, by the network entity, a communication based at least in part on the selected TCI state.

26. The method of claim 25, wherein the TCI state associated with the TCI list is a first TCI state in the TCI list or a TCI state with a lowest TCI state ID in the TCI list.

27. The method of claim 25, wherein the codepoint ID corresponds to a first codepoint with a TCI state activated by the MAC CE.

28. The method of claim 25, wherein the codepoint ID is a lowest codepoint ID activated by the MAC CE.

29. The method of claim 25, wherein the selected TCI state is a unified TCI state that indicates a common beam for at least one downlink channel or RS and at least one uplink channel or RS.

30. The method of claim 25, wherein the selected TCI state is a unified TCI state that indicates a common beam for more than one downlink channel or RS or more than one uplink channel or RS.

* * * * *